United States Patent
Kataoka et al.

[11] Patent Number: 5,901,630
[45] Date of Patent: May 11, 1999

[54] BAND SAW BLADE OR HACKSAW WITH DOUBLE FORMATION OF CUTTING ELEMENTS

[76] Inventors: Shinnosuke Funakubo Kataoka, 3-6-1 Gyotoku-Ekimae, Ichikawa-shi Chibaken 272-01, Japan; Toshio Saito Saito, Recreo. No. 95-705 Col.Del Valle Deleg.Benito, Juarez 03100, Mexico; Akira Funakubo Ishii, Circuito Rio Presas No. 14 Col., Paseos De Churubusco C.P. 09030, Mexico

[21] Appl. No.: 08/731,986

[22] Filed: Oct. 23, 1996

[30] Foreign Application Priority Data

Oct. 24, 1995 [MX] Mexico ................................. 954495

[51] Int. Cl.⁶ ................................. B27B 33/02
[52] U.S. Cl. ................. 83/835; 83/837; 83/846; 83/848
[58] Field of Search ............... 83/835, 846, 837, 83/842, 661, 850, 852, 854, 851, 853, 848

[56] References Cited

U.S. PATENT DOCUMENTS

| | | | |
|---|---|---|---|
| 907,168 | 12/1908 | Neill | 83/835 |
| 2,061,237 | 11/1936 | Karle, Sr. | 83/850 |
| 2,117,586 | 5/1938 | Willson | 83/853 |
| 2,336,030 | 12/1943 | Olson | 83/661 |
| 2,535,714 | 12/1950 | Anderson et al. | 83/854 X |
| 2,635,327 | 4/1953 | Enlow | 83/850 |
| 2,741,279 | 4/1956 | Stratton | 83/850 |
| 3,371,393 | 3/1968 | Grassmann | 83/851 |
| 3,990,334 | 11/1976 | Mellgren | 83/854 X |
| 4,015,331 | 4/1977 | Balke | 83/851 X |
| 4,236,432 | 12/1980 | Kawakami et al. | 83/848 |
| 4,461,198 | 7/1984 | Grassmann | 83/852 X |
| 4,784,034 | 11/1988 | Stones et al. | 83/852 |
| 4,913,022 | 4/1990 | Kuklinski | 83/851 X |
| 5,018,421 | 5/1991 | Lucki et al. | 83/661 X |
| 5,331,876 | 7/1994 | Hayden, Sr. | 83/848 X |
| 5,361,665 | 11/1994 | Sonefors | 83/848 |

FOREIGN PATENT DOCUMENTS 2097718  11/1982  United Kingdom ................. 83/852

*Primary Examiner*—M. Rachuba
*Attorney, Agent, or Firm*—Carmen Pili Curtis

[57] ABSTRACT

A band saw blade or hacksaw characterized because of it is machined with two rows of a plurality of cutting teeth, sustained and projecting from the base itself of the laminar body of the blade, the saw presents a laminar body at one of its ends while at the other end there are teeth with different geometries according to the use for soft cuts or hard cuts along the edge of said body of the band saw, being said rows formed by a pair of teeth of the same geometrical sizes of inverted "V" shape, but being in turn projected at an angular direction according to the required number of teeth +10 degrees, which is equivalent to the desired angle toward the external part of its axis, one with regard to the other, and alternatively followed by only one straight tooth of the same depth and so on, successively.

20 Claims, 4 Drawing Sheets

BAND SAW BLADE OR HACKSAW WITH DOUBLE FORMATION OF CUTTING ELEMENTS

BACKGROUND OF THE INVENTION

Different types of saws are known for hard or soft cuts, in different materials such as metals, wood, bones, plastic, etc. For instance, Mexican Patent number 154304 relates to an improved saw for cutting wood which presents a plurality of saw teeth formed along its entire length, characterized because said saw has a first plurality of saw teeth alternatively bent toward the right and toward the left, and a second plurality of saw teeth bigger than the first plurality of teeth, being the number of bigger saw teeth inferior to the number of the saw teeth corresponding to the first plurality.

Mexican Patent number 155819 relates to an improved diamond saw used to cut hard materials. In said saw, the steel plate is fixed with a synthetic body made up of abrasive diamond particles and an adhesive metal powder, characterized because it has a plurality of grooves with openings in the edges of both the front lateral face and the rear lateral face of the sinterized body.

U.S. Pat. No. 5,361,665 relates to a saw blade which contains, as cutting elements, teeth oriented towards the left and right of its axis, said teeth are tear teeth and planing teeth, all the teeth having interlining and pulling beveled edges, where the beveling of the consecutive teeth occurs on the alternate sides of the blade. The tear teeth have sharp tips while the planing teeth are truncated to form oblique upper surfaces and this permits to have planing teeth shorter than the tear teeth.

U.S. Pat. No. 5,331,876 relates to a saw blade to cut metal, which has straight teeth and saw setting teeth, in which the straight teeth extend up to a higher level than the saw setting teeth and are beveled on both sides in such a way that the beveled surfaces extend below the upper surfaces of the saw setting teeth.

U.S. Pat. No. 5,379,672 relates to a saw blade with cutting fins on the teeth, where said blade has teeth on the outer edge of the body of the blade, and the cutting fins extend from any side of each tooth on said body, being each tooth angled in a direction opposed to the one of the adjacent teeth in order to eliminate the blocking of the cut and to improve the cutting effect of the teeth. A first fin is bigger than the second fin and contains a lug to improve the cut, said fins have both a pre-cutting effect of the size of the material and a cutting effect and reduce the splintering and fragmentation of the blade on said material.

The object of the present invention is to offer a saw blade that is useful to cut conventional materials, either hard or soft, and that, through the form of the machining of its teeth, permits from one tooth to form two rows with a plurality of teeth combined with one straight tooth and so successively. It is thus possible to make straight cuts without ondulations and, because of the gap between each tooth pitch, it is possible to avoids the heating caused by friction during the cutting of the conventional materials.

SUMMARY OF THE INVENTION

The present invention relates to all types of saw blades for soft and hard cuts and for any type of band or hacksaw of cutting teeth of any geometric shape, being the saw blade characterized because it is machined with a double formation of cutting elements in which said cutting elements are a plurality of teeth in the shape of an inverted "V" with an oblique upper section in such a way that when they are divided they form two rows of identical teeth with the same depth, axially aligned and separated by a "V" shaped interior space, and located along the strip of the saw, alternating with straight teeth to be found on a plane perpendicular to the symmetry axis of the two rows of teeth.

It is thus an object of the present invention to provide a band saw blade or hacksaw for cutting soft or hard materials which is designed with a double formation of cutting elements alternatively with straight teeth that improve the cutting capacity.

A further object of the present invention is to provide a saw blade with double formation of teeth that do not require a wider strip and however increases its cutting capacity through the reduction of the heating caused by friction and allows to make precise straight cuts.

A further object of the present invention is to provide a saw blade design applicable to any geometric form of cutting teeth without affecting its cutting capacity and at a competitively low cost.

The "V" shape extends directionally along the band or peripherally in the case of a circular saw, in an alternate distribution with straight teeth in perpendicular position and next to the double cut teeth forming a double row segment having the same tooth depth and are prolonged to form an oblique section with sharp cuts, varying said oblique section in different angles for hard cuts or soft cuts.

Figure 8:
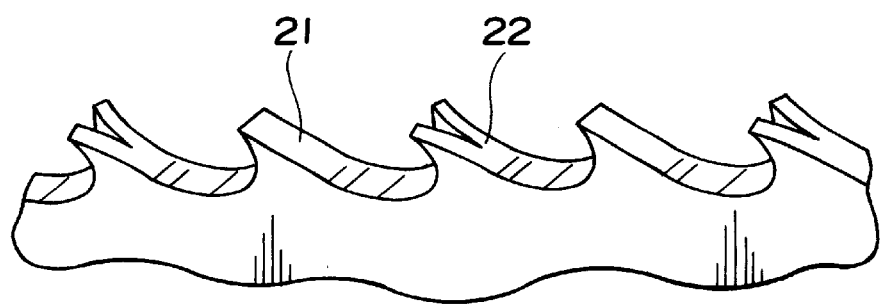

FIG. 8 shows an isometric top view showing the split teeth alternating with straight teeth.

Figure 9:
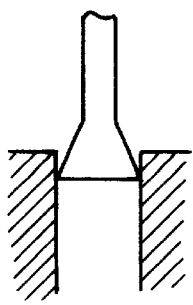

FIG. 9 is a side view of a straight tooth upon making a cut.

Figure 10:
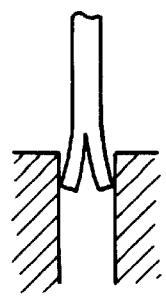

FIG. 10 is a side view of double cut teeth upon making a cut.

Figure 11:
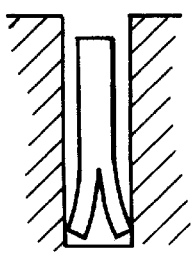
Figure 12:
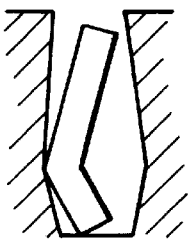
Figure 13:
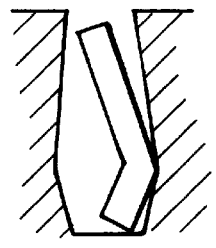

FIG. 11, 12 and 13 are views of a straight cut made with double cut teeth and straight teeth.

Figure 6:
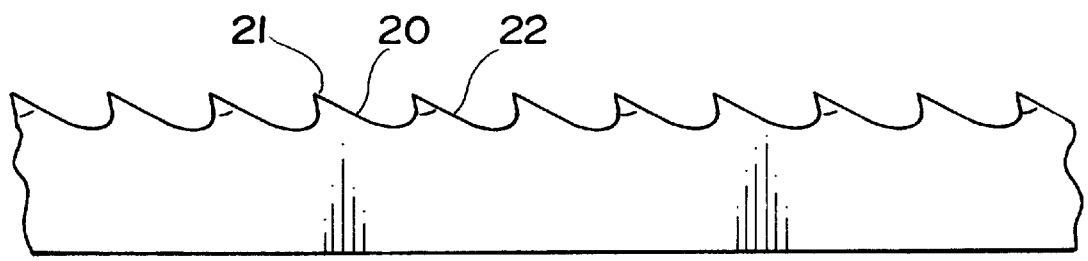
FIG. 6 is a front view of a saw blade buttress showing a wider gap between the teeth than the one of FIG. 1 for soft cuts (meat).
Figure 7:
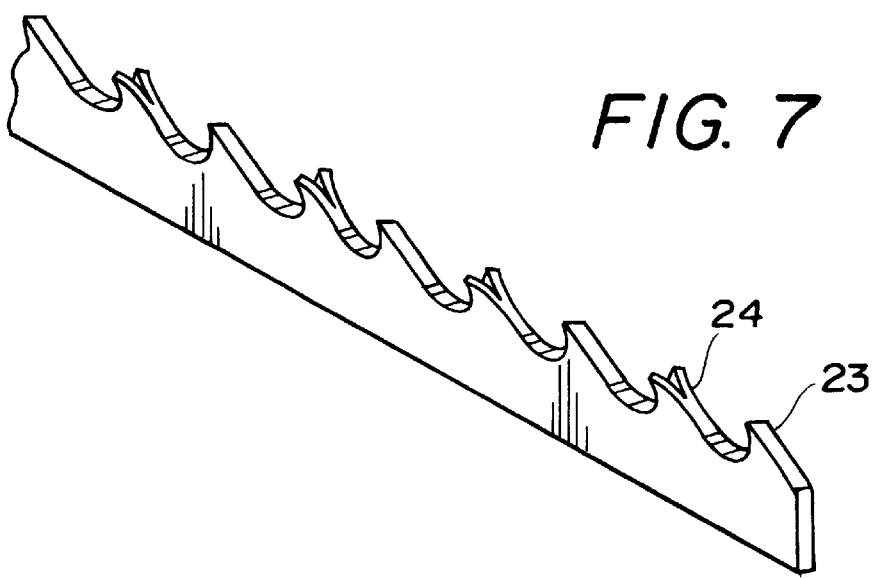
FIG. 7 is an isometric perspective view of FIG. 6 showing the double row tooth formation alternating with straight teeth.
Figure 14:
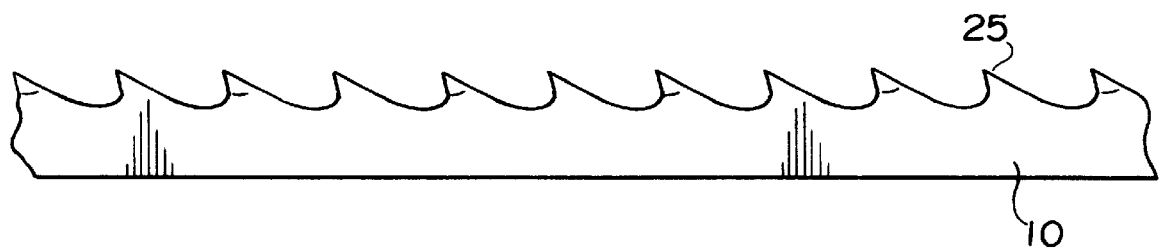

FIG. 14 is a front view of a band saw blade for soft cuts (such as wood) with a wider gap between the teeth of FIG. 6.

Figure 15:
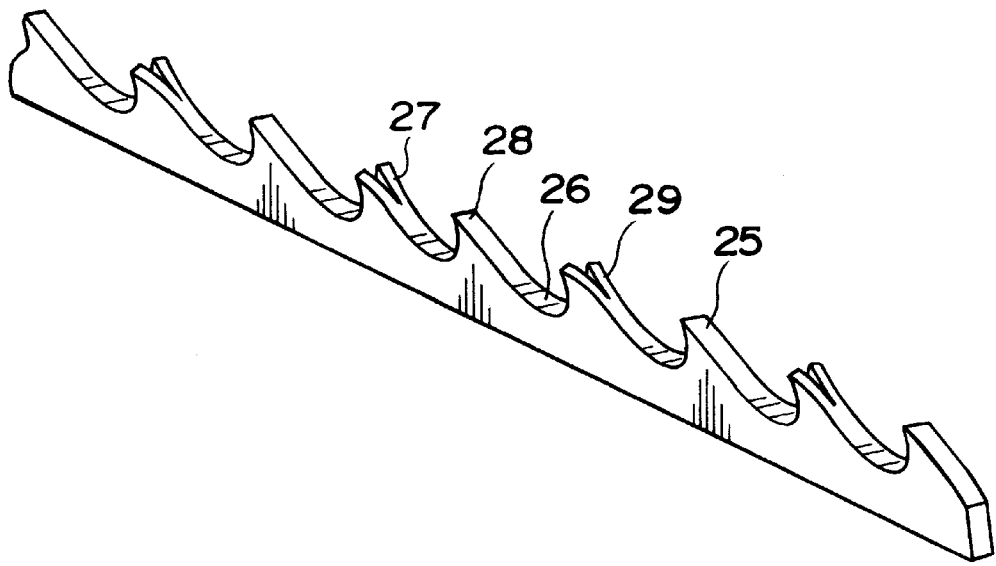

FIG. 15 is an isometric perspective view showing the disposition of double cut teeth and straight teeth.

Figure 16:
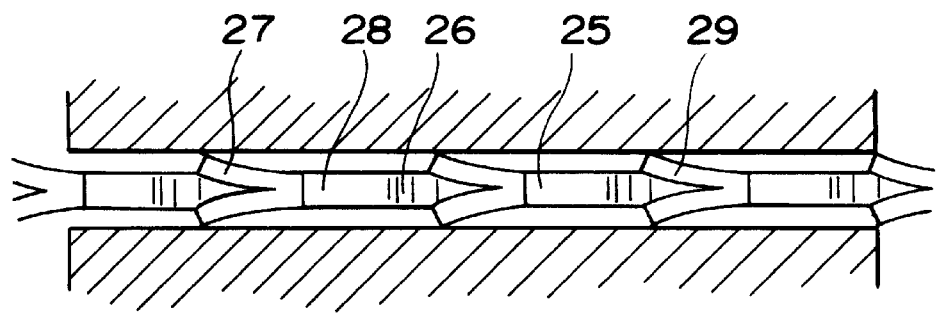

FIG. 16 is an isometric top view that shows one of the dispositions of double cut teeth in which each tooth shows alternatively a turn angle to the left and the other to the right.

Figure 17:
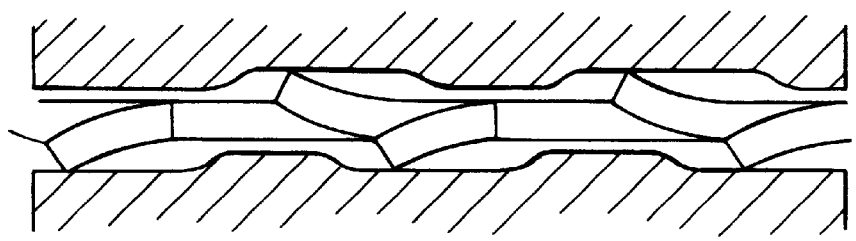

FIG. 17 is a prior art with a view similar to FIG. 6.

DETAILED DESCRIPTION OF THE INVENTION

In the manufacturing of cutting tools, the process known as SAW SETTING is used to open the way in the cut and help the advance of the cut. The saw setting is known in this technique as A) swage and B) saw setting. In order to understand better the present invention, these techniques shall hereinbelow be briefly described:

A) Swage, each given number of teeth, either welded or through pressure, forms a triangle, in the manufacturing of this swage, after marking the tooth, the tip of the tooth is welded, forming a ball at the tip, which can be made of the same material but occasionally it is made of different material, then it passes through a swage and is ready to be sharpened and to get a triangular shape. There is another manufacturing process for this swage, after coarsely marking the tooth, it passes through a swage and is then sharpened.

The advantages of the swage cut is that it provides a straight and clean cut, a lower resistance in the tool, and it is thus usually more common in sawmill cuts.

The disadvantages of the swage cut is that the width of the tooth is the same as the width of the cut, and thus it is resistant for soft cuts, but not for hard materials, the manufacturing of the swage is a longer and complicated process and it is not useful for all the teeth since it is only for large teeth.

B) Saw setting, this process is after marking the saw setting tooth, the first one is the alternating one in which a tooth bends to the right and the other to the left, as well as the cleaning saw setting in which a tooth bends to the right, a tooth bends to the left, and there is one straight tooth between them, this saw setting is used for steel and hard material cuts.

The disadvantage is that when cutting it rubs against the body of the tool and thus provokes wears and heating, and because of the position of the teeth the cut is ondulated, not straight, (unsplit teeth) see FIGS. 11, 12 and 13.

Figure 3:
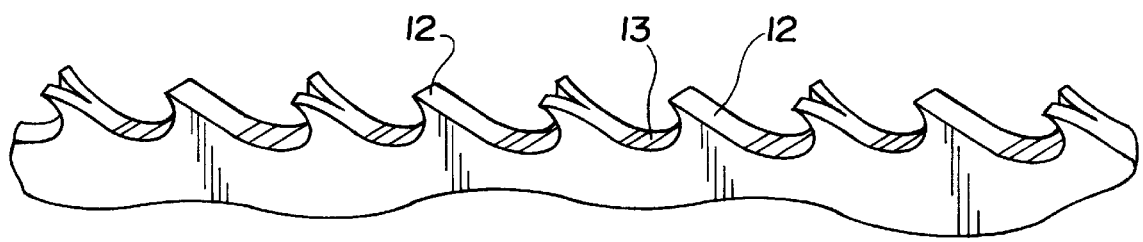
FIG. 3 is an isometric top view showing the tooth split to form the double row alternating with straight teeth.
Figure 4:
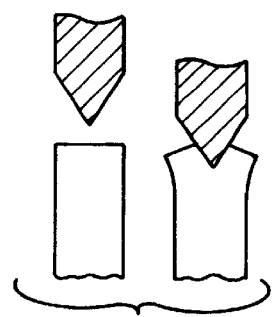
FIG. 4 is a front view of a tooth split by means of a die (a graver or a chisel).
Figure 5:
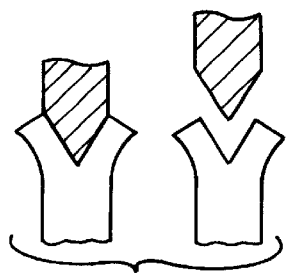
FIG. 5 is a front view of FIG. 5, showing the split tooth and the removed graver.

In the manufacturing process of cutting tools with double cutting elements, object of the present invention, once the strip has passed through tooth marking, it is introduced in a specially designed machine so that each given number of teeth are split in the direction of the cutting tooth FIG. 3, 4 and 5 and thus through this process, the applicant substitutes the conventional saw setting or swage process. The advantages of this process are:

The cutting mechanism is similar to the swage since the split tooth can be, according to the needs, with a wider or smaller angle and thus it can be applied to any tooth, being thus of advantage both in soft cuts as well as in steel and hard material cuts. In the case of hard cuts it is considered that the strength of the swage is in the tooth triangle provoking thus the breaking of the tool. In the case of our invention, the split tooth absorbs said forces and, since it is flexible, it avoids the breaking of the tool, FIG. 9.

Another advantage of the present invention is that the split tooth has three positions that work at the same time and are dividing the resistance. In the present invention, the cut is straight and thus does not damage the tool, providing a longer life to said tool. As it has already been explained, it combines the advantages of the swage and the saw setting and thus eliminates the disadvantages of said techniques. Thus this invention did not exist in the field of the tools, does not requires special materials, and can be applied to any cutting tool.

Figure 1:
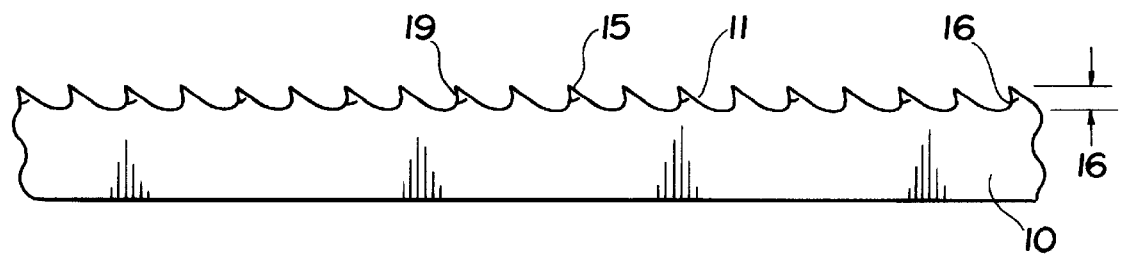
FIG. 1 is a front view of a band saw blade for precise steel cut or hard cut.

According to the drawings of FIG. 1 to 16, different types of cutting tools are described, depending on the use. For example, FIG. 1 shows a saw band for precise cut/steel or hard cut, that can also cut plastic, bone, etc. Said band is formed by a strip 10 and a plurality of saw teeth 11 formed along its entire length when it is of the band or hacksaw type or along its periphery when it is of the circular type. The teeth present only one configuration type, truncated, of the same size and geometry and thus the gaps between teeth are equal whether they relate to hard or soft cuts.

The tooth depth varies according to the number of teeth or tooth gap. The deeper the tooth depth, the lower the number of teeth and thus the cutting effect is bigger or the cutting amplitude larger.

When the tooth depth is lower, the number of teeth is larger and thus the cutting effect is smaller, for thinner cuts.

The thickness of the saw is conventional and depends on the desired cutting capacity.

Figure 2:
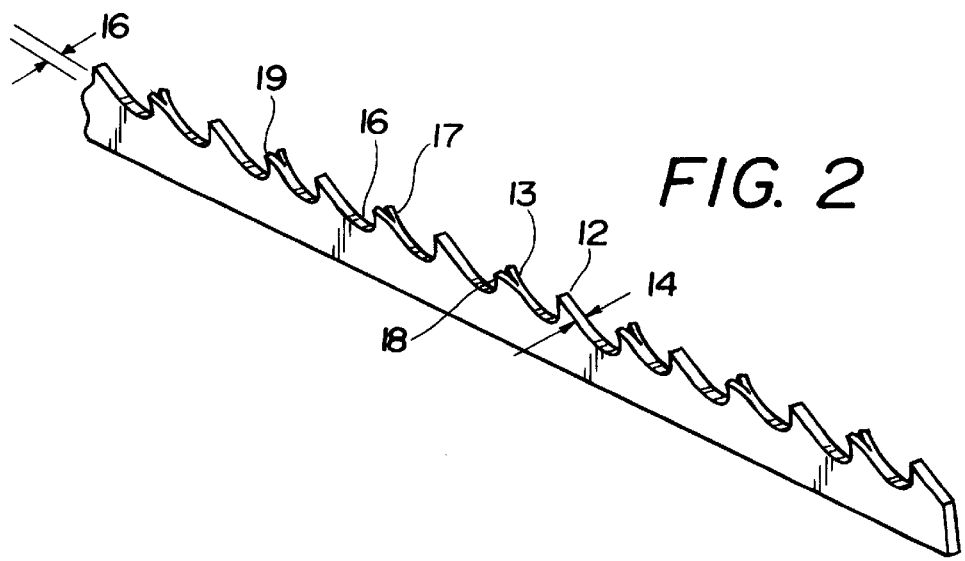
FIG. 2 is an isometric perspective view of FIG. 1 showing the double row tooth formation alternating with straight teeth.

The saw is characterized because it has an alternate sequence of one straight tooth 12 FIG. 2 and 3 along the thickness 14 of the strip 10, said tooth 12 extends from its depth 16 to an oblique section 15 with sharp cuts. Immediately after said tooth 12 or before it, there are split teeth 17, with assymmetrical cuts. Said assymmetrical cuts are bent, one to the left 18 and the other 17 to the right, and alternatively distributed along the saw, forming two rows of cutting elements. Adding their width together, it corresponds to the width of the strip 10. The inverted "V" shaped split teeth present the same deep stretch 16 that corresponds to the straight tooth 12. The angular projection 19 of the straight teeth 12 as well as the split teeth 17, 18 are oriented toward an angular direction that depends on the number of required teeth +10 degrees, which is equivalent to the desired angle toward the exterior part of its axis.

FIG. 6 shows a buttressed saw blade (band type) showing a larger gap 20 between the teeth 20 and 21 than the gap between the teeth of FIG. 1. This type of saw is useful for soft cuts, specially meat. Said band, as well as the band of FIG. 1 is integrated by straight teeth 23 and split teeth 24, FIG. 24, FIG. 7, forming two alternating cutting rows that, when cutting, FIG. 9 and 10, permit to obtain a straight cut without ondulations, since the straight tooth, FIG. 11, carries out the cut in a straight way while the split tooth completes the straight cut because a tooth is located toward the left and the other toward the right 13 and 12.

FIG. 14 describes another type of band saw, the grip type because of its teeth 25, useful for soft cuts such as wood. It shows, as in FIGS. 6 to 8, a gap 26 which even larger between its teeth. In this type of saw, the object of the invention which is to manufacture a saw with split teeth 27 alternating with straight teeth 28 to form a saw with two rows of cutting elements presenting a turn angle toward the left 28 and the other toward the right 29 is also used.

The desired turn angle is considered as 2 teeth (T)+10 degrees=12;3T+10 degrees=13; 2T+8 degrees=10 or 3T+8 degrees=11.

While particular embodiments of the present invention have been described and illustrated, it should be understood that the invention is limited only by the attached claims. Since modifications may be made by persons skilled in the art, the present application contemplates any and all modifications that fall within the spirit and scope of the invention disclosed and claimed herein.

What is claimed is:

1. A saw blade having a double formation of cutting elements for soft or hard cuts, the blade comprising:
    a strip having a plane with a first and second lateral sides running along a first longitudinal axis;
    a row of cutting elements disposed on the strip and lying on the same plane as the strip comprising a row of teeth having a plurality of alternating unsplit and split teeth separated by a gap, the unsplit teeth having cutting edges directed perpendicular to the first longitudinal axis and the split teeth having first cutting edges directed at an angle to the left of the cutting edges of the unsplit teeth and second cutting edges directed at an angle to the right of the cutting edges of the unsplit teeth; wherein each unsplit tooth of the plurality of unsplit teeth is followed by a split tooth of the plurality of split teeth and is preceded by a split tooth of the plurality of split teeth and for each split tooth, the first cutting edge has a flat rectangular end and the second cutting edge has a flat rectangular end.

2. The saw blade of claim 1 wherein the first cutting edges of the split teeth directed to the left of the cutting edges of the unsplit teeth are in alignment along a second longitudinal axis and the second cutting edges of the split teeth directed to the right of the cutting edges of the unsplit teeth are in alignment along a third longitudinal axis.

3. The saw blade of claim 1 wherein the first cutting edges of the split teeth are in symmetry with the second cutting edges of the split teeth.

4. The saw blade of claim 1 wherein the saw blade is of a different geometric shape instead of a strip, adapted for use in any type of cutting tool.

5. The saw blade of claim 4 wherein the cutting tool is selected from the group consisting of band saw, circular saw, and hack saw.

6. The saw blade of claim 1 wherein a height of each unsplit tooth and split tooth of the cutting elements are the same.

7. The saw blade of claim 1 wherein a height of each unsplit tooth and split tooth of the cutting elements vary according to the number of teeth in the row of teeth disposed on the strip.

8. The saw blade of claim 1 wherein the angle of the first and second cutting edges of the split teeth used for soft cuts is different from the angle of the first and second cutting edges of the split teeth used for hard cuts.

9. The saw blade of claim 1 wherein the left and right directed cutting edges of the split teeth are separated by a V shaped interior space.

10. The saw blade of claim 1 wherein the width of the row of teeth corresponds to the width of the strip.

11. The saw blade of claim 1 wherein the gap between the split and unsplit teeth differs for soft cuts and for hard cuts.

12. The saw blade of claim 1 wherein the gap between the split and unsplit teeth avoids heating caused by friction during cutting.

13. A method for making the saw blade of claim 1 for soft or hard cuts, comprising the steps of:

(a) providing a blade comprising a strip having a first and second lateral sides and an outer and an inner side;

(b) passing the strip through tooth marking;

(c) machining a row of cutting elements on the outer side of the blade; and (d) splitting alternate cutting elements thereby forming a row of alternating split and unsplit cutting element.

14. The method of claim 13 wherein the cutting element is a row of teeth having a plurality of alternating unsplit and split tooth; the unsplit tooth having cutting edges directed perpendicular to the first longitudinal axis and the split tooth having first cutting edges and second cutting edges.

15. The method of claim 14 further comprising bending the split tooth such that the first cutting edges is directed at an angle to the left of the cutting edges of the unsplit tooth and said second cutting edges directed at an angle to the right of the cutting edges of the unsplit tooth.

16. The method of claim 13 wherein the machining of the cutting element produces a gap that prevents heating caused by friction during cutting.

17. The method of claim 13 wherein the marking of the cutting element is by welding or through pressure.

18. The method of claim 13 wherein splitting is done with a die selected form a group consisting of a chisel and a graver.

19. The method of claim 13 wherein the splitting of alternate cutting elements in step (d) allows for production of straight cuts in the absence of undulations.

20. A saw blade having a double formation of cutting elements for soft or hard cuts, the blade comprising:

a strip having a plane with a first and second lateral sides running along a first longitudinal axis;

a row of cutting elements disposed on the strip and lying on the same plane as the strip comprising a row of teeth having a plurality of alternating unsplit and split teeth separated by a gap; the gap between the split and unsplit teeth differs for soft and hard cut such that the gap for soft cuts is wider than for hard cuts, and depth of each split tooth extends to the base of the blade;

the unsplit teeth having cutting edges directed perpendicular to the first longitudinal axis and the split teeth having first cutting edges directed at an angle to the left of the cutting edges of the unsplit teeth and second cutting edges directed at an angle to the right of the cutting edges of the unsplit teeth; wherein each unsplit tooth of the plurality of unsplit teeth is followed by a split tooth of the plurality of split teeth and is preceded by a split tooth of the plurality of split teeth, and for each split tooth, the first cutting edge has a flat rectangular end and the second cutting edge has a flat rectangular end.

* * * * *